United States Patent
Tsu et al.

(10) Patent No.: US 12,423,017 B2
(45) Date of Patent: Sep. 23, 2025

(54) SYSTEM AND METHOD FOR PERFORMING AND VERIFYING DATA ERASURE

(71) Applicant: N.F. Smith & Associates, LP, Houston, TX (US)

(72) Inventors: Phyllis Tsu, Houston, TX (US); Michael Mercado, Cypress, TX (US); David Smith, La Porte, TX (US); Jianning Yue, Houston, TX (US); Samuel Hinkhouse, Houston, TX (US)

(73) Assignee: N.F. Smith & Associates, LP, Houston, TX (US)

( * ) Notice: Subject to any disclaimer, the term of this patent is extended or adjusted under 35 U.S.C. 154(b) by 617 days.

(21) Appl. No.: 16/840,086

(22) Filed: Apr. 3, 2020

(65) Prior Publication Data

US 2021/0311650 A1 Oct. 7, 2021

(51) Int. Cl.
*G06F 3/06* (2006.01)
*G06F 16/9035* (2019.01)
*G06F 16/9038* (2019.01)

(52) U.S. Cl.
CPC .......... *G06F 3/0652* (2013.01); *G06F 3/0604* (2013.01); *G06F 3/0659* (2013.01); *G06F 3/0679* (2013.01); *G06F 16/9035* (2019.01); *G06F 16/9038* (2019.01)

(58) Field of Classification Search
CPC .... G06F 3/0652; G06F 3/0604; G06F 3/0659; G06F 3/0679; G06F 16/9035; G06F 16/9038; G06F 16/162
See application file for complete search history.

(56) References Cited

U.S. PATENT DOCUMENTS

| | | | | |
|---|---|---|---|---|
| 2003/0193826 | A1* | 10/2003 | Hsu | G11C 17/18 365/185.05 |
| 2005/0091383 | A1* | 4/2005 | Bender | H04L 67/1097 709/228 |
| 2007/0103989 | A1* | 5/2007 | Nakazawa | G11C 16/16 365/185.29 |

(Continued)

OTHER PUBLICATIONS

"Secure and Certified Data Erasure Software—BitRaser," Retrieved from the Internet: URL: https://www.bitraser.com/ [Retrieved on Apr. 3, 2020].

(Continued)

*Primary Examiner* — Hosain T Alam
*Assistant Examiner* — Alan Otto
(74) *Attorney, Agent, or Firm* — Blank Rome LLP

(57) ABSTRACT

A method includes receiving, at a computing device, inventory data identifying a plurality of computer readable storage devices. The method further includes receiving, at the computing device, a first request to perform a memory management operation. The method further includes sending, from the computing device to a first station, a command to perform the memory management operation on a first portion of the plurality of computer readable storage devices connected to the first station. The method further includes receiving, at the computing device from the first station, first results data indicating results of the memory management operation at the first station. The method further includes updating the inventory data based on the first results data.

19 Claims, 7 Drawing Sheets

(56) References Cited

U.S. PATENT DOCUMENTS

| | | | | |
|---|---|---|---|---|
| 2007/0235516 A1* | 10/2007 | Georgis | ............ | G11B 23/0302 235/487 |
| 2010/0141692 A1* | 6/2010 | Winarski | ................ | G08B 5/36 345/690 |
| 2017/0091222 A1* | 3/2017 | Neumann | ............ | G06F 16/184 |
| 2019/0354298 A1* | 11/2019 | Öberg | .................. | G06F 3/0652 |

OTHER PUBLICATIONS

"Hard Drive & Disk Eraser Software—Blancco," Retrieved from the Internet: URL: https://www.blancco.com/products/drive-eraser/ [Retrieved on Apr. 3, 2020].

"PC-Doctor Computer & Android Hardware Diagnostic Software Tools, PC Repair Kits," Retrieved from the Internet: URL: https://www.pc-doctor.com/ [Retrieved on Apr. 3, 2020].

"WipeDrive Enterprise—WhiteCanyon Software," Retrieved from the Internet: URL: https://www.whitecanyon.com/wipedrive-enterprise [Retrieved on Apr. 3, 2020].

* cited by examiner

US 12,423,017 B2

SYSTEM AND METHOD FOR PERFORMING AND VERIFYING DATA ERASURE

TECHNICAL FIELD

This disclosure relates to data erasure.

BACKGROUND

Companies and individuals store data on computer readable storage devices (e.g., hard disc drives). This data is used for various purposes. For example, a company may provide services, such as Internet shopping services, media content distribution services, database services, etc., using data stored on a large number of computer readable storage devices. Eventually, the computer readable storage devices used for data storage are replaced or discarded. Data stored on the computer readable storage devices may be private and various jurisdictions may have particular requirements regarding protection of private data.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Figure 1:
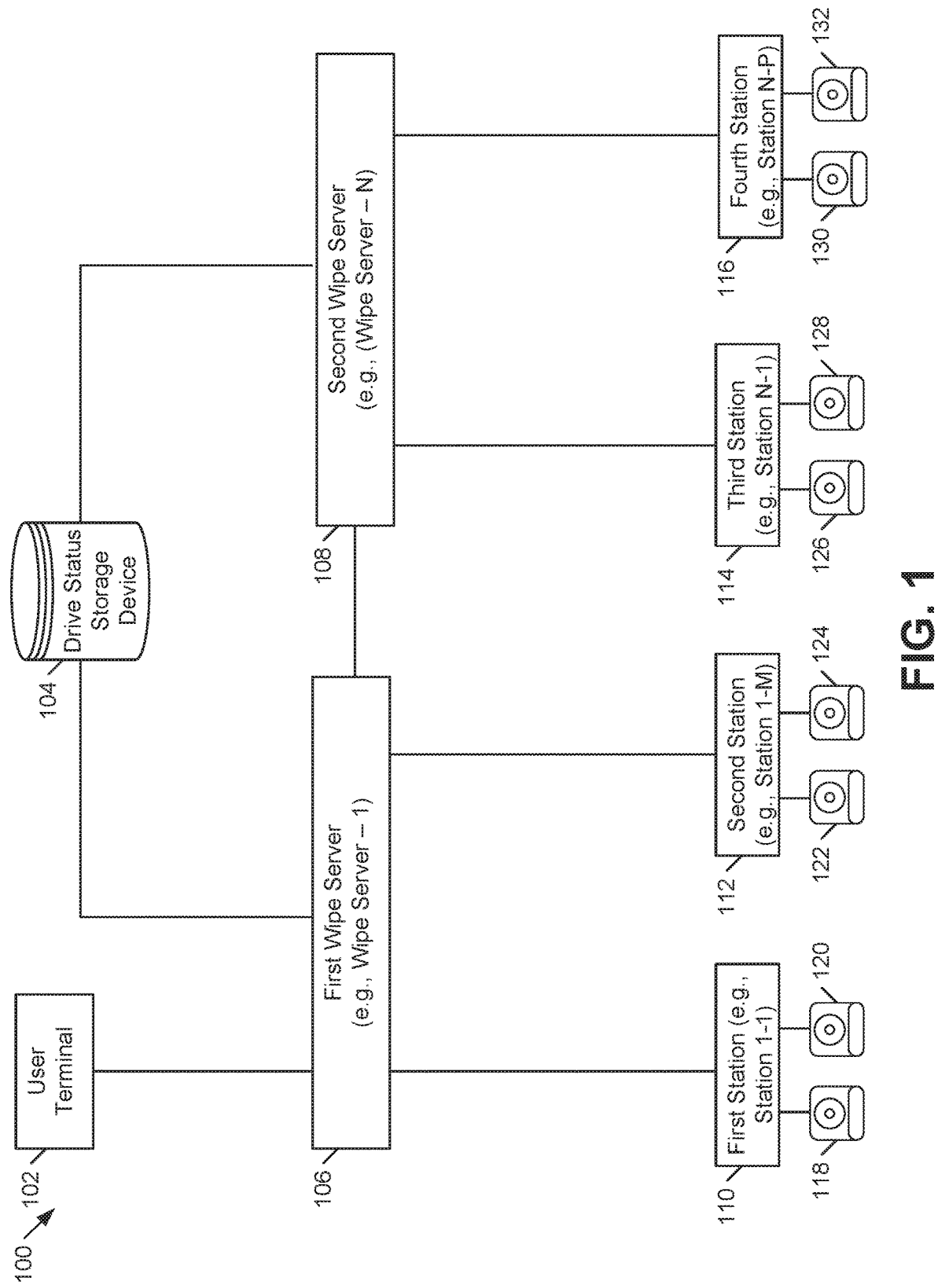
FIG. 1 illustrates a system for performing and verifying data erasure.

In the drawings and the description of the drawings herein, certain terminology is used for convenience only and is not to be taken as limiting the embodiments of the present disclosure. In the drawings and the description below, like numerals indicate like elements throughout.

Systems and methods for performing and verifying data erasure are disclosed. By utilizing the disclosed systems and methods, private data may be verified as destroyed. Some implementations include a wipe server that receives inventory data identifying computer readable storage devices to be processed. The wipe server is connected to and configured to control one or more wipe stations that are configured to perform data erasure and verification on one or more computer readable storage devices. Further, the wipe server may coordinate with one or more additional wipe servers that are each in turn connected to one or more wipe stations. The wipe server is configured to update the inventory data based on results data generated by the wipe stations upon completion of memory management operation (e.g., a data erasure operation, a data erasure verification operation, etc.).

Because the wipe server can support multiple wipe stations and can coordinate with additional wipe servers, the wipe server can initiate memory management operations on any number of computer readable storage devices. Further, because the wipe server receives inventory data identifying computer readable storage devices to be processed, the wipe server can determine that a particular computer readable storage device identified by the inventory data is not operational in response to receiving no results data for the particular computer readable storage device.

Referring to FIG. 1, a diagram of a system 100 for performing and verifying data erasure is shown. The system 100 includes a user terminal 102. The user terminal 102 corresponds to a computing device and includes or is connected to one or more input devices, such as a barcode scanner, a keyboard, a microphone, a camera, etc. The system 100 further includes a drive status storage device 104. The drive status storage device 104 includes one or more hard disc drives, one or more flash memory devices, one or more other memory devices, or a combination thereof. In some implementations the drive status storage device 104 corresponds to a cloud based storage system. The system 100 further includes a first wipe server 106 and a second wipe server 108. The wipe servers 106, 108 include one or more computing devices. In some implementations, the wipe servers 106, 108 correspond to cloud based systems implemented by one or more computing devices. In some implementations, the system 100 includes more or fewer wipe servers. For example, the system 100 may include between 1 and N wipe servers, where N is a positive integer. In some implementations, one or both of the user terminal 102 and the drive status storage device 104 is a component of one of the wipe servers 106, 108. The system further includes a first wipe station 110, a second wipe station 112, a third wipe station 114, and a fourth wipe station 116. The wipe stations 110, 112, 114, 116 include computing device and interfaces for communicating with one or more computer readable storage devices, such as hard disk drives, flash drives, other types of computer readable storage devices, etc. In some implementations, the system 100 includes more or fewer wipe servers. For example, the system 100 may include between 1 and X wipe stations, where X is a positive integer. The system 100 may include more or fewer components.

In the illustrated example, the user terminal 102 is connected to the first wipe server 106. While a direct connection is illustrated, the user terminal 102 may be connected to the first wipe server 106 through a network. For example, the user terminal 102 may be connected to a web interface provided by the first wipe server 106 over the Internet.

The first wipe server 106 is further connected to the drive status storage device 104 and to the second wipe server 108. The second wipe server 108 is also connected to the drive status storage device 104. While direct connections are shown, the wipe servers 106, 108 may be connected to each other and/or to the drive status storage device 104 over a network.

The first wipe server 106 is connected to the first wipe station 110 and to the second wipe station while the second wipe server 108 is configured to the third wipe station 114, 116. While direct connections are shown, the wipe servers 106, 108 may be connected to the corresponding wipe stations 110, 112, 114, 116 via a network, such as the Internet. Each of the wipe servers 106, 108 is configured to manage memory management operations (e.g., data erasures and data erasure verifications) carried out by the wipe stations connected to that wipe server.

In the illustrated example, a first computer readable storage device 118 and a second computer readable storage device 120 are connected to the first station 110, a third computer readable storage device 122 and a fourth computer readable storage device 124 are connected to the second station 112, a fifth computer readable storage device 126 and a sixth computer readable storage device 128 are connected to the third station 114, and a seventh computer readable storage device 130 and an eighth computer readable storage device 132 are connected to the fourth station 116. The computer readable storage devices 118, 120, 122, 124, 126, 128, 130, 132 include hard disc drives, flash memory drives, other type of memory devices, or a combination thereof. While two computer readable storage devices are connected to each of the stations 110, 112, 114, 116 in FIG. 2, it should be noted that each station may support any number of computer readable storage devices.

The wipe servers 106, 108 are configured to issue commands to the stations 110, 112, 114, 116 to perform memory management operations (e.g., data erasure, data erasure verification, etc.) on the computer readable storage devices 118, 120, 122, 124, 126, 128, 130, 132 connected to the stations 110, 112, 114, 116. Capacity of the system 100 for performing memory management operations may be increased by adding additional wipe servers, additional stations, or a combination thereof. Thus, the system 100 may scale to support data erasure/erasure verification on any number of computer readable storage devices.

Further, the wipe servers 106, 108 are configured to store inventory data identifying which computer readable storage devices are to be processed by the system 100 and to update the inventory data to indicate results of memory management operations as reported by the stations 110, 112, 114, 116. Because the drive status storage device 104 includes an inventory of the computer readable storage devices to be processed, the wipe servers 106, 108 may determine that any computer readable storage device for which no result data is received is not operational.

Figure 2:
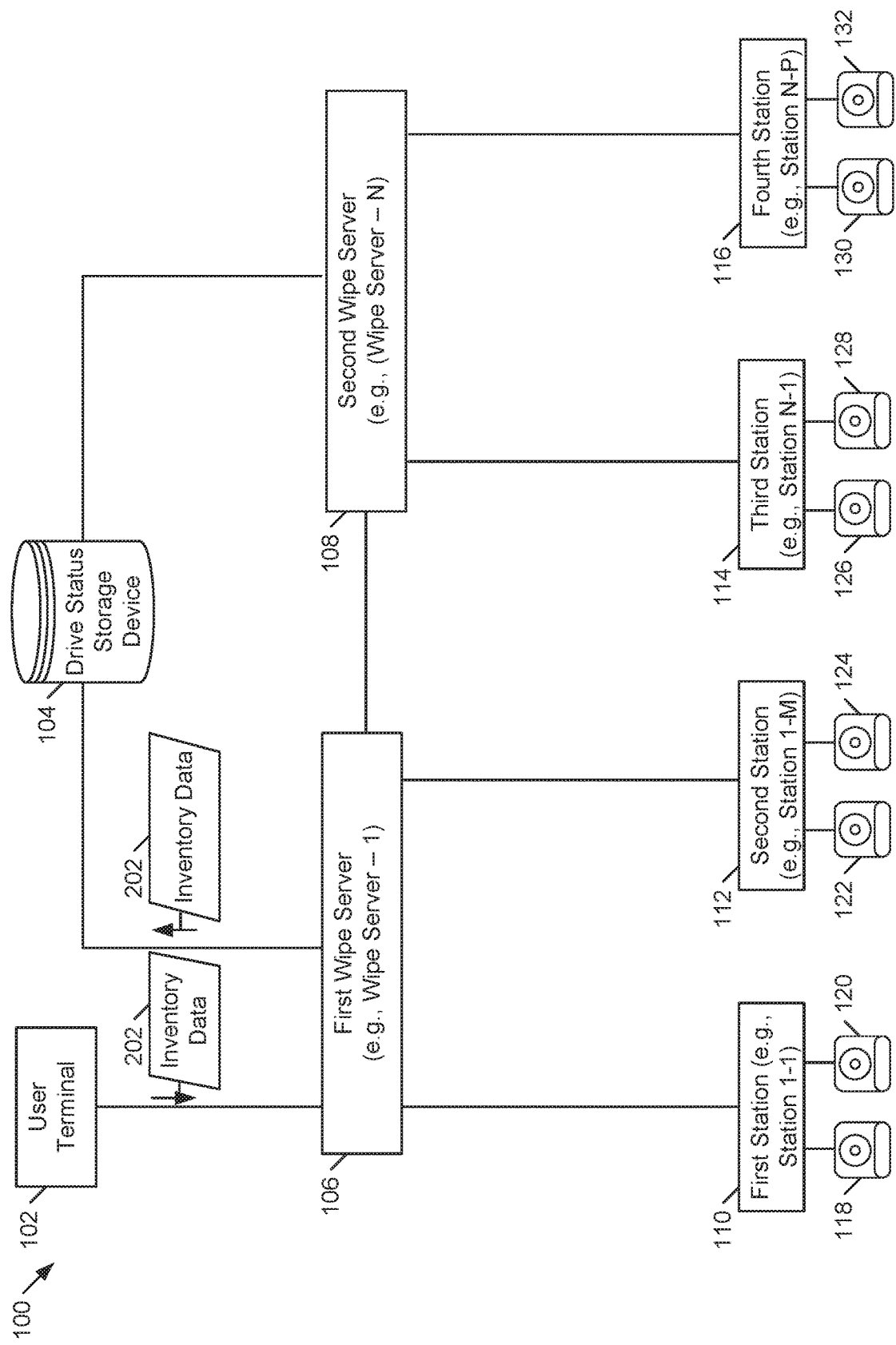
FIG. 2 is a diagram illustrating the system receiving inventory data.

Referring to FIG. 2, a diagram illustrating the system 100 receiving inventory data is shown. As illustrated, the user terminal 102 transmits inventory data 202 to the first wipe server 106. The inventory data 202 includes unique identifiers of the computer readable storage devices 118, 120, 122, 124, 126, 128, 130, 132 to be processed by the system 100. The unique identifiers may include serial numbers or other identifiers. In some implementations, the inventory data 202 includes further information, such as a group identifier. A group identifier corresponds to a set of computer readable storage devices. In some implementations, a group identifier corresponds to a person or other entity that has submitted the computer readable storage devices of the group for processing. For example, "group 1" may identify computer readable storage devices received from "customer A." The inventory data 202 may be manually input at the user terminal 102, may be generated at the user terminal 102, may be generated automatically at the user terminal 102 based on scanned barcodes, or may be received from another computing device, or a combination thereof.

The first wipe server 106 receives the inventory data 202 and stores the inventory data 202 in the drive status storage device 104. In some implementations, the first wipe server 106 modifies the inventory data 202 to include a status field for each computer readable storage device identified in the inventory data 202. The status field is configured to store an indicator of whether that computer readable storage device has passed or failed a memory management operation. The status field may be set to "Null" by the first wipe server 106. In some implementations, the user terminal 102 adds the status field to the inventory data 202 before transmitting the inventory data 202 to the first wipe server 106.

Figure 3:
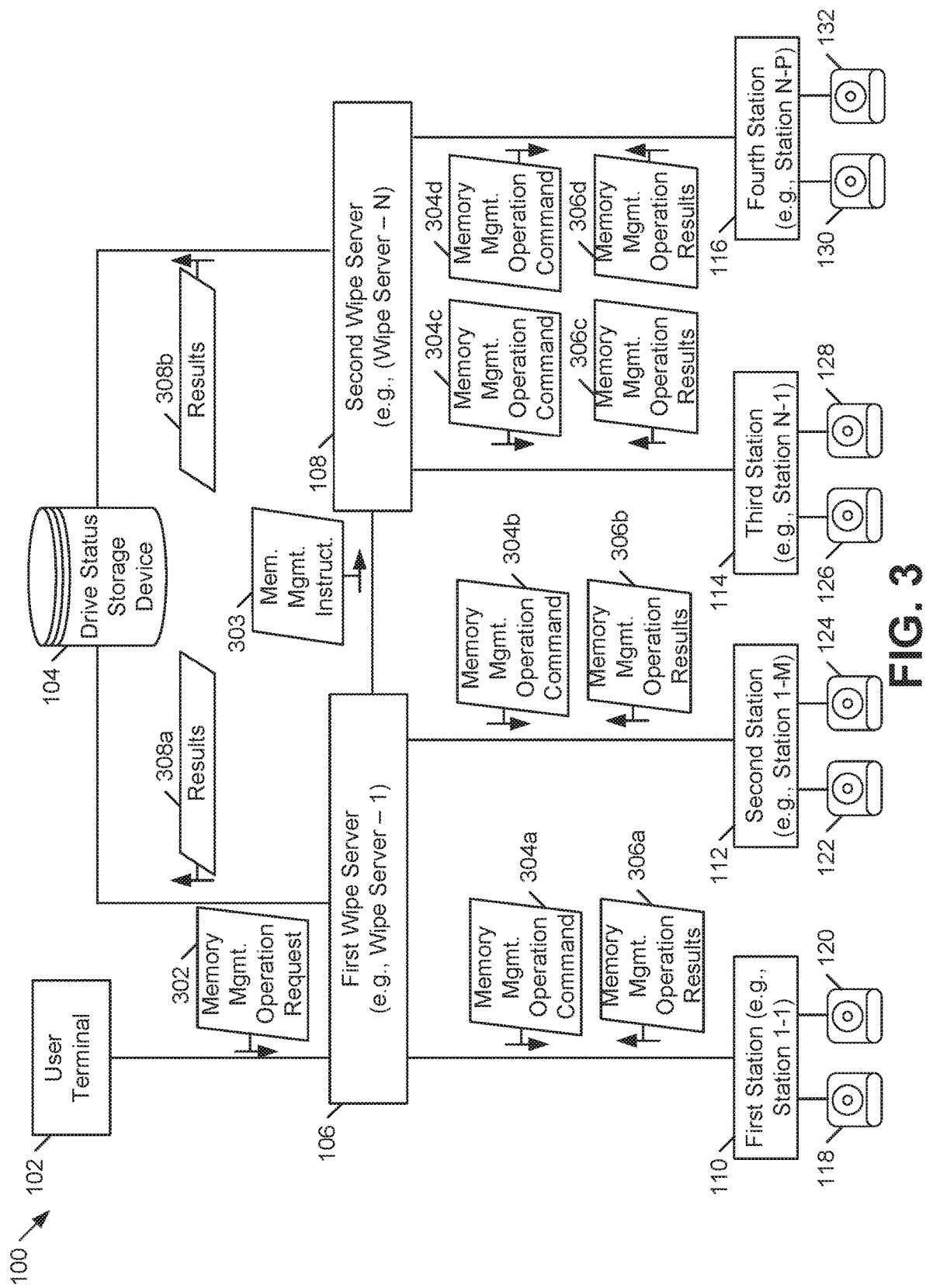
FIG. 3 is a diagram illustrating the system performing a memory management operation.

Referring to FIG. 3, a diagram illustrating the system 100 performing a memory management operation (e.g., data erasure, data erasure verification, or a combination thereof) is shown. In the illustrated example, the user terminal 102 transmits a memory management operation request 302 to the first wipe server 106. While illustrated as originating from the same user terminal 102 that generated the inventory data 202, in some implementations, the inventory data 202 and the memory management operation request 302 are sent to the first wipe server 106 by different user terminals. Further, while FIGS. 1 and 2 depict the same wipe server receiving the inventory data 202 and the memory management operation request 302, in some implementations, different wipe servers receive the inventory data 202 and the memory management operation request 302. In some implementations, the memory management operation request 302 identifies one or more erasure techniques, one or more data erasure verification techniques, one or more group identifiers, or a combination thereof.

The first wipe server 106 is configured to send memory management operation commands to stations connected to the first wipe server 106 and to send memory management operation instructions to other wipe servers connected to the first wipe server 106 in response to the memory management operation request 302. The memory management operation instructions 303 instruct the other wipe servers to send erase commands to stations connected to those wipe servers. The memory management operation commands indicate one or more memory management operations (e.g., data erasure, data erasure verification, or a combination thereof) to be performed at the stations. In some implementations, the memory management operation commands include parameters for performing the memory management operation. For example, the memory management operation commands may indicate one or more data erasure techniques, one or more data erasure verification techniques, one or more group identifiers, or a combination thereof. In the illustrated example, the first wipe server sends memory management operation commands 304*a*, 304*b* to the stations 110, 112 and sends memory management operation instructions 303 to the second wipe server 108. In response to the memory management operation instructions 303, the second wipe server 108 sends memory management operation commands 304*c*, 304*d* to the stations 114, 116 connected to the second wipe server 108. In some implementations, the memory management operation commands 304*a*, 304*b*, 304*c*, 304*d* are pushed to the stations 110, 112, 114, 116 automatically while in other implementations, the memory management operation commands 304*a*, 304*b*, 304*c*, 304*d* are sent to the stations 110, 112, 114, 116 in response to a request for a command from the stations 110, 112, 114, 116.

The stations 110, 112, 114, 116 are configured to perform the one or more memory management operations indicated by the memory management operation commands 304*a*, 304*b*, 304*c*, 304*d* on the computer readable storage devices 118, 120, 122, 124, 126, 128, 130, 132. In some implementations, each of the stations 110, 112, 114, 116 include light emitting diodes (LEDs) configured to indicate a status, at each attached computer readable storage device, of a memory management operation in progress. For example, the first station 110 may include a first LED associated with the first computer readable storage device 118 and a second LED associated with the second computer readable storage device. The first station 110 may be configured to adjust a color of the first LED based on progress of a memory management operation on the first computer readable storage device 118 and to adjust a color of the second LED based on progress of the memory management operation on the second computer readable storage device 120. In some implementations, the stations 110, 112, 114, 116 are further configured to update the LEDs to indicate a status of a completed memory management operation. For example, the first station 110 may set the first LED associated with the first computer readable storage device 118 to a first color (e.g., blue) associated with the first computer readable storage device 118 in response to determining that a completed memory management operation succeeded on the first computer readable storage device 118. As another example, the first station 110 may set the second LED associated with the second computer readable storage device 120 to a second color (e.g., yellow) in response to determining that no result of the memory management operation is available for the second computer readable storage device 120 (e.g., because the second computer readable storage device 118 is not operational). Further, the second station 112 may set an LED associated with the third computer readable storage device 112 to a third color (e.g., red) in response to determining that the memory management operation failed on the third computer readable storage device 122.

The stations 110, 112, 114, 116 are further configured to read identifiers of connected computer readable storage devices from memory of the connected computer readable storage devices. Upon completion of the one or more memory management operations indicated by the memory management operation commands 304a, 304b, 304c, 304d, the stations 110, 112, 114, 116 are configured to generate memory management operation results 306a, 306b, 306c, 306d mapping the identifiers to results (e.g., pass or fail) of the one or more memory management operations on the connected computer readable storage devices. However, in the event that a particular computer readable storage device is not operational, the station processing the particular computer readable storage device will not (e.g., may be unable to) read an identifier of the particular computer readable storage device and will not include the identifier of the particular computer readable storage device (or a corresponding result) in the memory management operation results. For example, in response to the second computer readable storage device 120 being disabled, the first station 110 may be unable to read an identifier of the second compute readable storage device 120. Accordingly, the memory management operation results 306a generated by the first station 110 may not include a result or an identifier associated with the second computer readable storage device 120.

The wipe servers 106, 108 are configured to receive the memory management operation results 306a, 306b, 306c, 306d generated by the stations 110, 112, 114, 116 and update the inventory data stored in the drive status storage device 104 accordingly. In the illustrated example, the wipe servers 106, 108 store results data 308a, 308b in the drive status storage device 104. The results data 308a, 308b indicates one or more computer readable storage device identifiers and one or more corresponding memory management operation results. For example, the results data 308a may indicate that the first computer readable storage device 118 (indicated by an identifier, such as "1") passed the memory management operation indicated by the memory management operation command 304a while the third computer readable storage device 122 (indicated by an identifier, such as "3") failed the memory management operation indicated by the memory management operation command 304b. For each identifier included in the results data 308a, 308b, the wipe servers update a corresponding entry in the inventory data stored in the drive status storage device 104 based on the result associated with the identifier. The results data 308a, 308b may not include identifiers or corresponding memory management operation results for one or more computer readable storage devices (e.g., because the corresponding stations may be unable to read identifiers from non-operational computer readable storage devices). Accordingly, the wipe servers 106, 108 may determine that a drive is not operational based on a corresponding entry in the inventory data stored in the drive status storage device 104 lacking a status indicator.

Figure 4:
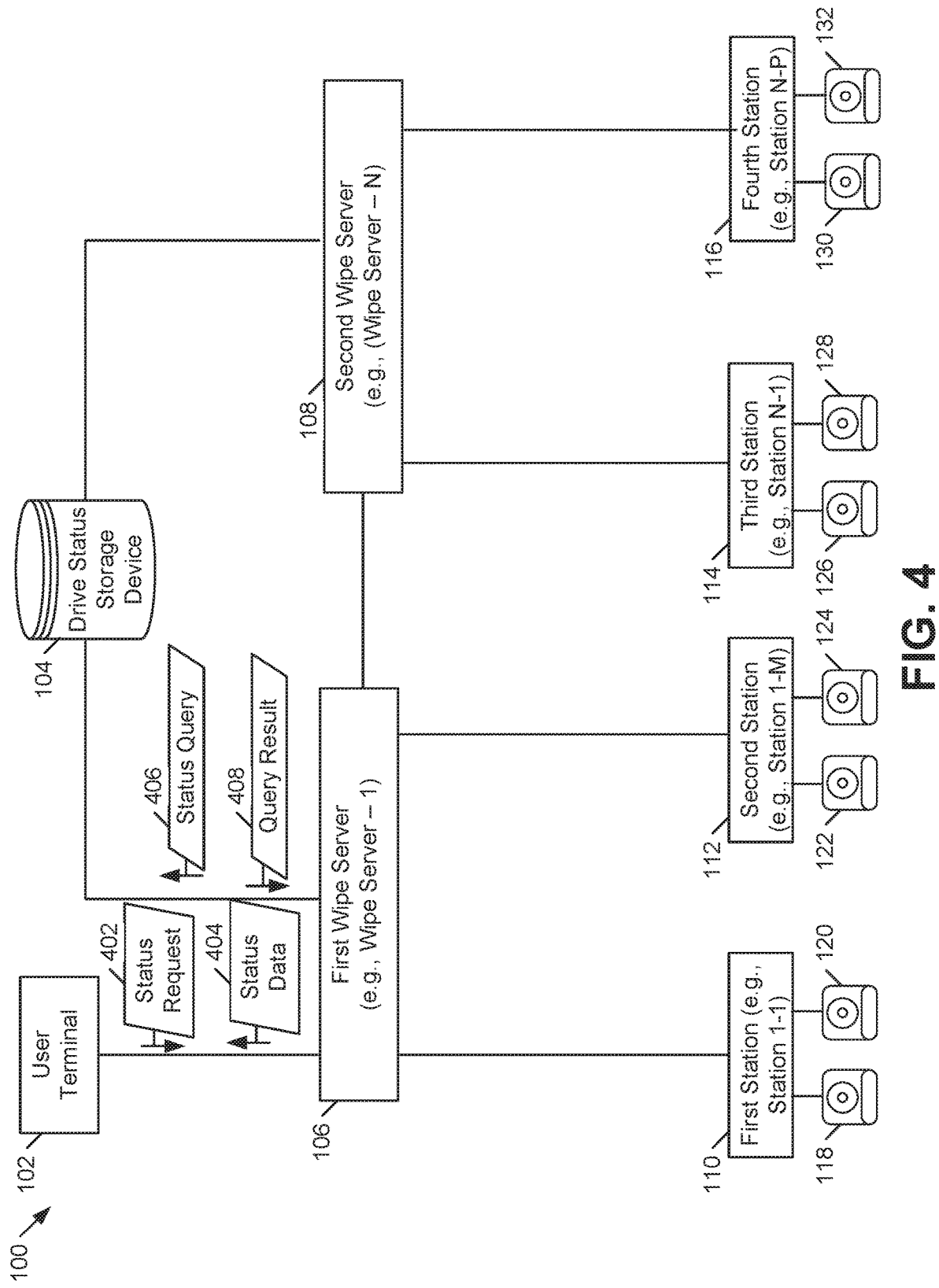
FIG. 4 is a diagram illustrating the system reporting status data.

Referring to FIG. 4, a diagram illustrating the system 100 reporting status data is shown. In the illustrated example, the user terminal 102 sends a status request 402 to the first wipe server 106. It should be noted that the status request 402 may be sent from a different computing device and/or be sent to a different wipe server.

The status request 402 includes one or more identifiers of the computer readable storage devices 118, 120, 122, 124, 126, 128, 130, 132 that are inventoried in the inventory data stored by the drive status storage device 104. The first wipe server 106 generates a status query 406 requesting results for each of the one or more identifiers indicated in the status request 402 and transmits the status query 406 to the drive status storage device 104. In response, to the status query 406, the drive status storage device 104 returns query result 408 indicating, for each identifier of the one or more identifiers included in the status query 406, a result of the memory management operation command 304 or an indication that no result is available for the identifier (e.g., a result associated with identifier is "Null").

Based on the query result 408, the first wipe server 106 generates status data 404 identifying a status of each of one or more identifiers included in the status request 402. In response to a particular identifier lacking a result in the query result 408, the first wipe server 106 determines that the particular computer readable storage device associated with the particular identifier is not operational and generates the status data 404 accordingly. In response to the particular identifier including a result in the query result 408, the first wipe server 106 generates the status data 404 to indicate the result as the status of the particular computer readable storage device associated with the particular identifier. In an illustrative example, in response to the query result 408 indicating that the first computer readable storage device 118 passed the memory management operation indicated by the memory management operation command 304, the second computer readable storage device 120 has no result of the memory management operation, and the third computer readable storage device 122 failed the memory management operation, the first wipe server 106 generates the status data 404 to indicate that the first computer readable storage device 118 passed the memory management operation, the second computer readable storage device 120 is not operational, and the third computer readable storage device 122 failed the memory management operation.

Thus, FIGS. 2-4 illustrate that the system 100 may be used to perform memory management operations, such as data erasure, data erasure verification, etc., on computer readable storage devices. Because the system 100 may include any number of wipe servers that each support a number of stations, any number of computer readable storage devices may be processed by the system 100. Further, the system 100 tracks received inventory and updates the received inventory to indicate whether devices in the received inventory have passed or failed memory management operations. Accordingly, the system 100 can determine whether a particular computer readable storage device is not operational based on a corresponding entry in inventory data lacking a result of a memory management operation.

Figure 5:
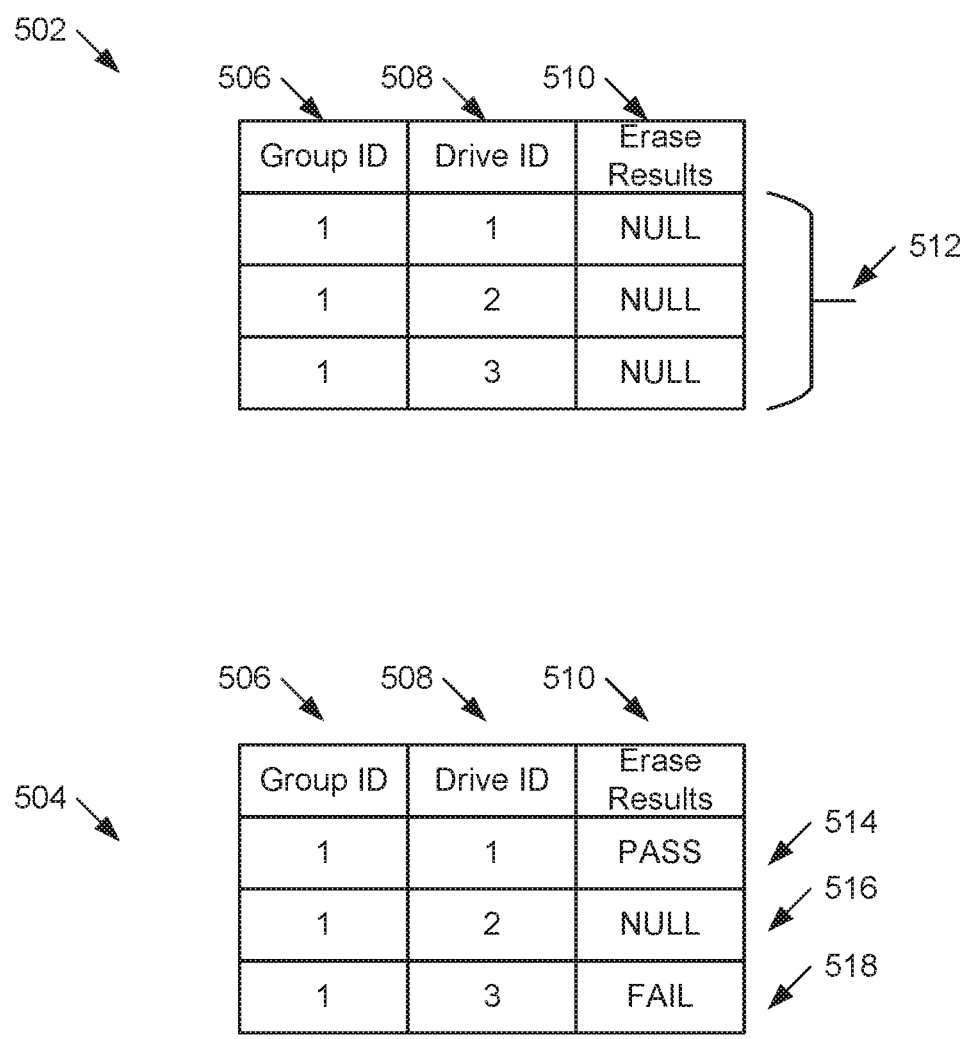
FIG. 5 illustrates examples of inventory data that may be utilized by the system for performing and verifying data erasure.

Referring to FIG. 5, examples of inventory data that may be utilized by the system 100 are shown. FIG. 5 depicts first inventory data 502. The first inventory data 502 may correspond to the inventory data 202 stored in the drive status storage device 104. Each entry of the first data 502 includes a group identifier (ID) 506, a drive ID 508, and erasure results 510. As shown at 512, the erasure results field 510 of each of the entries is set to NULL.

FIG. 5 further depicts second inventory data 504. The second inventory data 504 may correspond to the inventory data as updated by the wipe servers 106, 108 with the results 308a, 308b. A first entry for a drive ID 1 has a first erasure result 514 indicating the computer readable storage device with a drive ID 1 passed a memory management operation (e.g., data erasure and/or data erasure verification). A second entry for a drive ID 2 has no result (e.g., a second erasure result 516 is NULL) indicating that the drive associated with ID 2 is not operational. A third entry for a drive ID 3 has a third erasure result 618 indicating that the drive associated with ID 3 failed the memory management operation.

In a first illustrative example in which the second inventory data 504 is stored in the drive status storage device 104, the status request 402 of FIG. 4 includes the drive ID 1. Accordingly, the first wipe server 106 generates the status query 406 identifying the drive ID 1 and receives the query result 408 indicating that the computer readable storage device associated with the drive ID 1 has passed a memory management operation. Accordingly, the first wipe server 106 generates the status data 404 indicating that the computer readable storage device associated with the drive ID 1 has passed the memory management operation.

In a second illustrative example in which the second inventory data 504 is stored in the drive status storage device 104, the status request 402 includes the drive ID 2. Accordingly, the first wipe server 106 generates the status query 406 identifying the drive ID 2 and receives the query result 408 indicating that the computer readable storage device associated with the drive ID 2 has no result for a memory management operation. Accordingly, the first wipe server 106 generates the status data 404 indicating that the computer readable storage device is not operational.

In a third illustrative example in which the second inventory data 504 is stored in the drive status storage device 104, the status request 402 includes the drive ID 3. Accordingly, the first wipe server 106 generates the status query 406 identifying the drive ID 3 and receives the query result 408 indicating that the computer readable storage device associated with the drive ID 1 has failed a memory management operation. Accordingly, the first wipe server 106 generates the status data 404 indicating that the computer readable storage device associated with the drive ID 3 has failed the memory management operation.

Thus, FIG. 5 illustrates data structures that may be used to track inventory during memory management operations and to detect that one or more computer readable storage devices is not operational.

Figure 6:
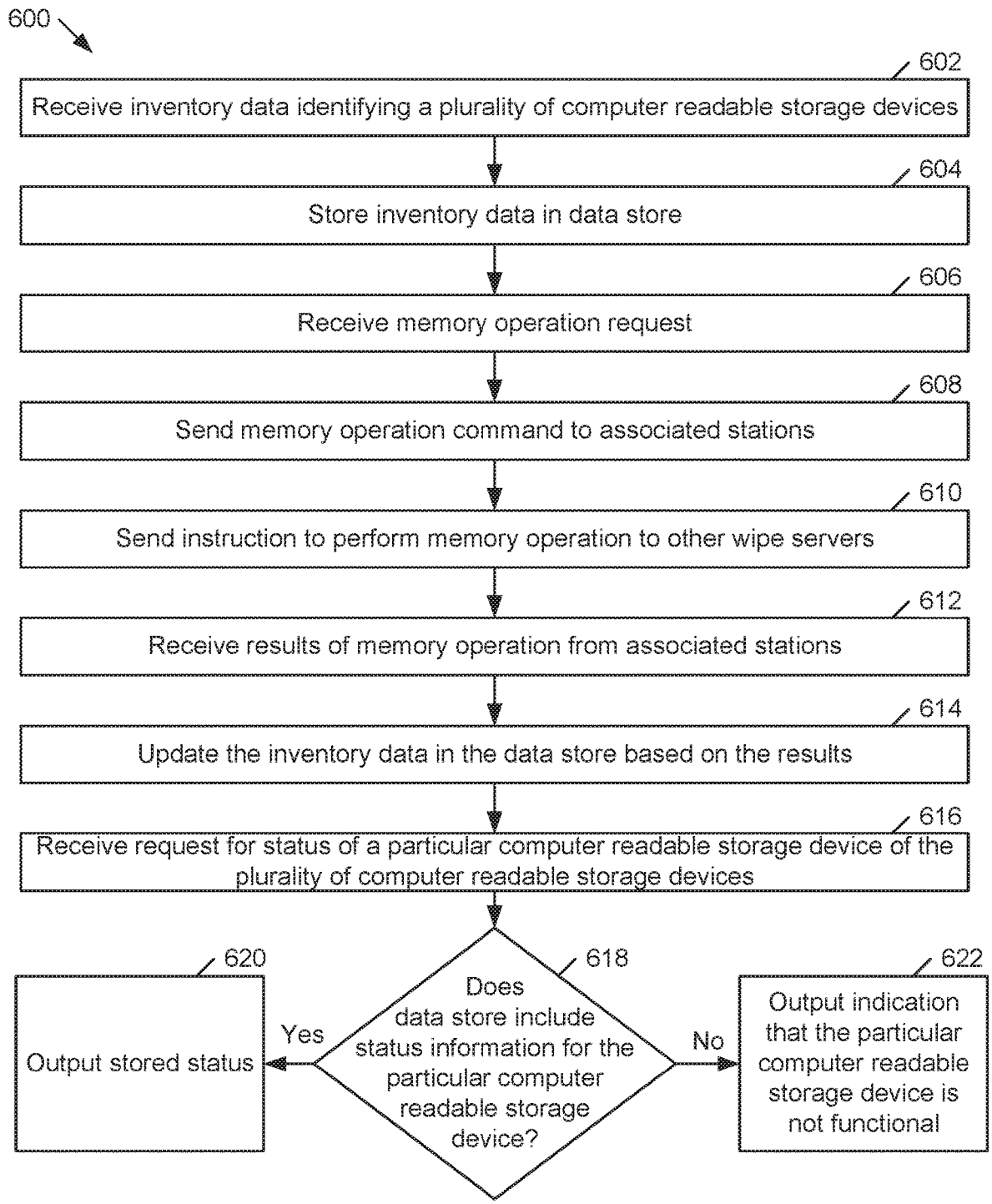
FIG. 6 is a flowchart illustrating a method for performing a memory operation, such as data erasure and/or verification.

Referring to FIG. 6, a flowchart illustrating a method 600 for performing a memory operation, such as data erasure, erasure verification, or hardware testing, is shown. The method 600 may be performed by a wipe server, such as the wipe servers 106, 108 of FIGS. 1-4. The method 600 includes receiving inventory data identifying a plurality of computer readable storage devices, at 602. For example, the first wipe server 106 may receive the inventory data 202 identifying the computer readable storage devices 118, 120, 122, 124, 126, 128, 130, 132 from the user terminal 102.

The method 600 further includes storing the inventory data in a data store, at 604. For example, the first wipe server 106 may store the inventory data 202 in the drive status storage device 104.

The method 600 further includes receiving a memory operation request, at 606. For example, the first wipe server 106 receive the memory management operation request 302.

The method 600 further includes sending a memory operation command to stations associated with the wipe server, at 608. For example, the first wipe server 106 may send the memory management operation commands 304a, 304b to the stations 110, 112 connected to the first wipe server 106. The memory management operation commands 304a, 304b instruct the stations 110, 112 to perform data erasure and data erasure verification, data erasure verification, or hardware testing on connected computer readable storage devices.

The method 600 further includes sending instructions to perform the memory operation to wipe servers, at 610. For example, the first wipe server 106 may send the memory management operation instruction 303 to the second wipe server 108 instructing the second wipe server 108 to issue the commands 304c, 304d to the stations 114, 116 connected to the second wipe server 108.

The method 600 further includes receiving results data indicating results of the memory operation at the stations associated with the wipe server, at 612. For example, the first wipe server 106 may receive the memory management operation results 306a indicating results of the memory management operation at the first station 110 and the memory management operation results 306b indicating results of the memory management operation at the second station 112.

The method 600 further includes updating the inventory data in the data store based on the results data, at 614. For example, the first wipe server 106 may write the results 308a to the drive status storage device 104 based on the memory management operation results 306a, 306b received form the stations 110, 112. It should be noted that other wipe servers, such as the second wipe server 108, may also write results to the drive status storage device 104. For example, the second wipe server 108 may write the results 308b to the drive status storage device 104 based on the memory management operation results 306c, 306d received from the stations 114, 116.

The method 600 further includes receiving a request for a particular compute readable storage device of the plurality of computer readable storage devices, at 616. For example, the first wipe server 106 may receive the status request 402 requesting a status of one or more of the computer readable storage devices 118, 120, 122, 124, 126, 128, 130, 132.

The method 600 further includes determining whether the data store includes status information for the particular computer readable storage device, at 618. For example, the first wipe server 106 may issue the status query 406 to the drive status storage device 104 and receive the query result 408 to determine whether the one or more computer readable storage devices identified in the status request 402 have associated status information.

The method 600 further includes, in response to determining that the particular computer readable storage device has an associated stored status, outputting the stored status, at 620. For example, the first wipe server 106 may output the status data 404 identifying a status of a particular computer readable storage device as received in the query result 408.

The method 600 further includes, in response to determining that the particular computer readable storage device has no associated stored status, outputting an indication that the particular computer readable storage device is not functional, at 622. For example, the first wipe server 106 may output the status data 404 indicating that a particular computer readable storage device is not functional in response to the query result 408 lacking a status (e.g., status is Null) for the particular computer readable storage device.

Thus, the method 600 may be used to perform memory management operations and to output statuses (e.g., results) of the memory management operations. Further, the method 600 may be used to determine that a particular drive is not operational. Thus, the method 600 may be used to process and sort devices as part of an information technology asset disposition ("ITAD") service.

Figure 7:
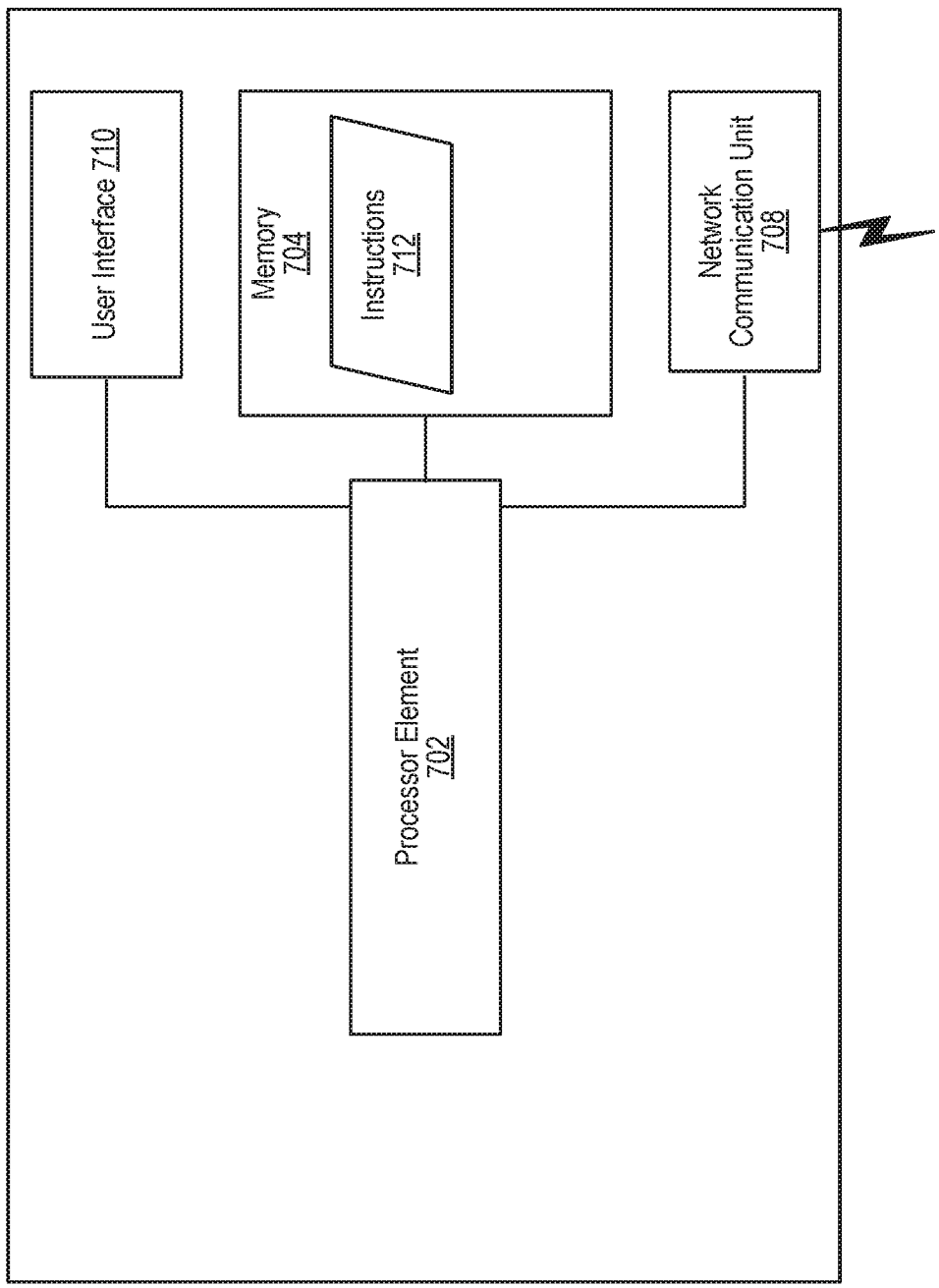
FIG. 7 is a block diagram of a computing device that may be used in a system for performing and verifying data erasure.

Referring now to FIG. 7, a block diagram illustrates a computing device 700 that is usable to implement the techniques described herein in accordance with one or more embodiments. For example, in some implementations, the computing device 700 corresponds the user terminal 102, the first wipe server 106, the second wipe server 108, the first station 110, the second station 112, the third station 114, or the fourth station 116.

The computing device 700 includes a processor element 702 that contains one or more hardware processors, where each hardware processor has a single or multiple processor cores. In one embodiment, the processor element 702 includes at least one shared cache that stores data (e.g., computing instructions) that are utilized by one or more other components of processor element 702. In a particular example, the shared cache corresponds to locally cached data stored in a memory for faster access by components of the processor element 702. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to, a central processing unit (CPU), a microprocessor, and a digital signal processor (DSP), a graphics processing unit (GPU), an application specific integrated circuit (ASIC), and a field-programmable gate array (FPGA).

FIG. 7 illustrates that a memory 704 is operatively coupled to the processor element 702. In some embodiments, the memory 704 corresponds to a non-transitory medium configured to store various types of data. In an illustrative example, the memory 704 includes one or more memory devices that comprise a non-volatile storage device and/or volatile memory. Examples of non-volatile storage devices include disk drives, optical drives, solid-state drives (SSDs), tap drives, flash memory, read only memory (ROM), and/or any other type memory designed to maintain data for a duration time after a power loss or shut down operation. An example of volatile memory is random access memory (RAM). In the illustrated example, the memory 704 stores instructions 712. The instructions 712 are executable by the processor element 702 to perform one or more of the operations or methods described with respect to FIGS. 1-6.

Persons of ordinary skill in the art are aware that software programs may be developed, encoded, and compiled in a variety computing of languages for a variety software platforms and/or operating systems and subsequently loaded and executed by the processor element 702. In one embodiment, the compiling process of the software program transforms program code written in a programming language to another computer language such that the processor element 702 is able to execute the programming code. For example, the compiling process of the software program may generate an executable program that provides encoded instructions (e.g., machine code instructions) for processor element 702 to accomplish specific, non-generic, particular computing functions.

After the compiling process, the encoded instructions are then loaded as computer executable instructions or process steps to the processor element 702 from storage (e.g., the memory 704) and/or embedded within the processor element 702 (e.g., cache). The processor element 702 executes the stored instructions or process steps in order to perform operations or process steps to transform the computing device into a non-generic, particular, specially programmed machine or apparatus. Stored data, e.g., data stored by a storage device, can be accessed by the processor element 702 during the execution of computer executable instructions or process steps to instruct one or more components within the computing device 700.

As shown in FIG. 7, the computing device 700 includes one or more input/output devices, such as a network communication unit 708 that could include a wired communication component and/or a wireless communications component, coupled to processor element 702. The network communication unit 708 corresponds to one or more transceiver unit(s) that utilize one or more of a variety of standardized network protocols, such as Wi-Fi, Ethernet, transmission control protocol/Internet Protocol (TCP/IP), etc., to effect communications between devices.

In the example of FIG. 7, the computing device 700 further includes a user interface 710 that may include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an organic LED (OLED) display. Some implementations of the computing device do not include the user interface 710.

It should be noted that in some examples, various components described herein may include more than one computing device, such as the computing device 700. For example, the individual components of the system 100 may include a plurality of computing devices in a cloud computing architecture.

The various embodiments described above are provided by way of illustration only and should not be construed so as to limit the scope of the disclosure. Various modifications and changes can be made to the principles and embodiments described herein without departing from the scope of the disclosure and without departing from the claims which follow.

The invention claimed is:

1. An apparatus comprising: one or more processors having instructions executable by the one or more processors to: receive, at a user interface, inventory data identifying each of a plurality of computer readable storage devices;

modify the inventory data to include a status field for each of the plurality of computer readable storage device, wherein the status field for each of the plurality of computer readable storage devices is configured to store a result indicator; receive, at a computing device, a first request to perform a memory management operation; send, from the computing device to a first station, a command to perform the memory management operation on a first portion of the plurality of computer readable storage devices connected to the first station, wherein the first station includes a first status indicator light, the first status indicator light comprising at least one LED that is configured to change color based on the memory management operation; receive, at the computing device from the first station, first results data indicating results of the memory management operation at the first station; update the inventory data based on the first results data, wherein the first station is configured to change a color of the at least one LED of the at least one status indicator light based on the status of the memory management operation being performed being in progress or completed, the at least one LED being a first color in response to a successfully completed memory operation, the at least one LED being a second color in response to no result being available of the memory management operation, and the at least one LED being a third color in response to a failed memory management operation; output, from the computing device, a response to a status request indicating whether any of the plurality of computer readable storage devices is not operational in response to the status field having the "Null" identifier showing no result of the memory management operation associated with that particular computer readable storage device.

2. The apparatus of claim 1, wherein the instructions are further executable to: receive, at the computing device, a status request for a status of a particular computer readable storage device of the first portion of the plurality of computer readable storage devices; and output, from the computing device, a response to the status request indicating that the particular computer readable storage device is not operational in response to the updated inventory data lacking a result of the memory management operation associated with the particular computer readable storage device.

3. The apparatus of claim 1, wherein the instructions are further executable by the one or more processors to: send, from the computing device to a second station, a second command to perform the memory management operation on a second portion of the plurality of computer readable storage devices connected to the second station, the second station comprising at least one LED that is configured to change color based on progress of the memory management operation on the second portion of the plurality of computer readable storage devices; receive, at the computing device from the second station, second results data indicating results of the memory management operation at the second station; and update the inventory data based on the second results data.

4. The apparatus of claim 1, wherein the instructions are further executable by the one or more processors to send, from the computing device to a second computing device, an instruction to send a third command to perform the memory management operation to a second station, wherein a second portion of the plurality of computer readable storage devices is connected to the second station.

5. The apparatus of claim 1, wherein the memory management operation includes a data erasure operation.

6. The apparatus of claim 1, wherein the memory management operation includes a data erasure verification operation.

7. The apparatus of claim 1, wherein the memory management operation includes a hardware test operation.

8. The apparatus of claim 1, wherein the computing device is configured to determine whether one or more of the first portion of the plurality of computer readable storage devices identified by the inventory data is not operational based on a corresponding entry in the inventory data lacking a result of the memory management operation for the one or more computer readable storage devices; and configured to sort out of the first portion of the plurality of computer readable storage devices the one or more computer readable storage devices determined to be not operational.

9. The apparatus of claim 1, further comprising an input device coupled to the computing device configured to input the identifying data at the user interface.

10. The apparatus of claim 9, wherein the input device is a barcode scanner.

11. The apparatus of claim 1, wherein the instructions include pre-receiving, at the user terminal, the inventory data identifying each of the plurality of computer readable storage devices even if the computer readable storage device is not operational, the user terminal being connected to at least one input device; and after pre-receiving the inventory data at the user terminal, transmitting the inventory data from the user terminal to the computing device.

12. A computer readable storage device stores instructions executable by one or more processors to: receive, at a user interface, inventory data identifying a plurality of computer readable storage devices; modify the inventory data to include a status field for each of the plurality of computer readable storage devices, wherein the status field for each of the plurality of computer readable storage devices is configured to store a result indicator; initially set each status field to a "Null" identifier; receive, at a computing device, a first request to perform a memory management operation, the memory management operation including a data erasure or data erasure verification; send, from the computing device to a first station, a command to perform the memory management operation on a first portion of the plurality of computer readable storage devices connected to the first station; receive, at the computing device from the first station, first results data indicating results of the memory management operation at the first station; update the inventory data based on the first results data, receive, at the computing device, a status request for a status of a particular computer readable storage device of the plurality of computer readable storage devices in view of the updated inventory data; and output, from the computing device, a response to the status request indicating that the particular computer readable storage device is not operational in response to the status field having the "Null" identifier showing no result of the memory management operation associated with that particular computer readable storage device.

13. The computer readable storage device of claim 12, wherein the instructions are further executable to: receive, at the computing device, a status request for a status of a particular computer readable storage device of the first portion of the plurality of computer readable storage devices; and output, from the computing device, a response to the status request indicating that the particular computer readable storage device is not operational in response to the updated inventory data lacking a result of the memory management operation associated with the particular computer readable storage device.

14. The computer readable storage device of claim 12, wherein the instructions are further executable by the one or more processors to: send, from the computing device to a second station, a second command to perform the memory management operation on a second portion of the plurality of computer readable storage devices connected to the second station; receive, at the computing device from the second station, second results data indicating results of the memory management operation at the second station; and update the inventory data based on the second results data.

15. The computer readable storage device of claim 12, wherein the instructions are further executable by the one or more processors to send, from the computing device to a second computing device, an instruction to send a third command to perform the memory management operation to a second station, wherein a second portion of the plurality of computer readable storage devices is connected to the second station.

16. The computer readable storage device of claim 12, wherein the memory management operation includes a data erasure operation.

17. The computer readable storage device of claim 12, wherein the memory management operation includes a data erasure verification operation.

18. The computer readable storage device of claim 12, wherein the instructions include pre-receiving, at the user terminal, the inventory data identifying each of the plurality of computer readable storage devices even if the computer readable storage device is not operational, the user terminal being connected to at least one input device; and after pre-receiving the inventory data at the user terminal, transmitting the inventory data from the user terminal to the computing device.

19. An apparatus for verifying data erasure of computer readable storage devices, comprising: a wipe server having one or more processors with instructions executable by the one or more processors, the wipe server controlling a plurality of wipe stations, each of the plurality of wipe stations being configured to perform a memory management operation on a plurality of computer readable storage devices, each of the plurality of wipe stations including a status indicator light that comprises at least one LED that is configured to change color based on progress of the memory management operation, the at least one wipe server being configured to: pre-receive, at a user terminal, inventory data identifying each of the plurality of computer readable storage devices even if the computer readable storage device is not operational, the user terminal being connected to at least one input device; modify the inventory data to include a status field for each of the plurality of computer readable storage devices, wherein the status field for each of the plurality of computer readable storage devices is configured to store a result indicator of the memory management operation; initially set each status field to a "Null" identifier; command the plurality of wipe stations to perform a memory management operation on the plurality of computer readable storage devices, the memory management operation including a data erasure verification; receive, from the plurality of wipe stations, results data indicating results of the memory management operation conducted on the plurality of computer readable storage devices; update the inventory data based on the results data; and output a response to a status request indicating whether any of the plurality of computer readable storage devices is not operational in response to the status field having the "Null" identifier showing no result of the memory management operation associated with the computer readable storage device.

* * * * *